Aug. 12, 1969  J. LEACH  3,460,599
TUBELESS TIRE HAVING IMPROVED CHAFER FABRIC
Filed Sept. 6, 1967
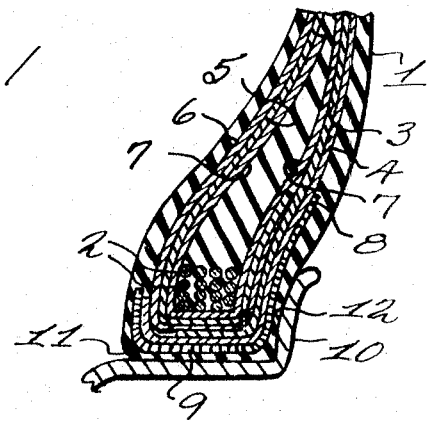
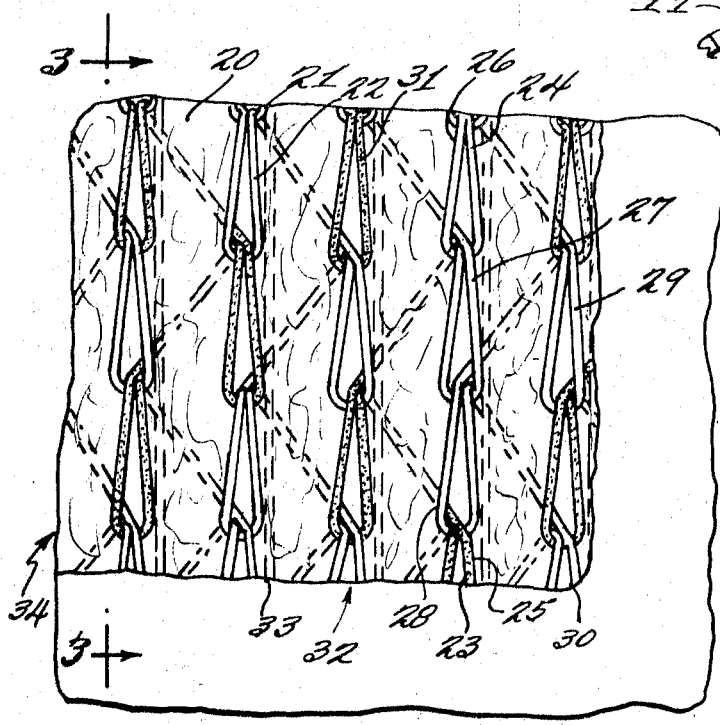
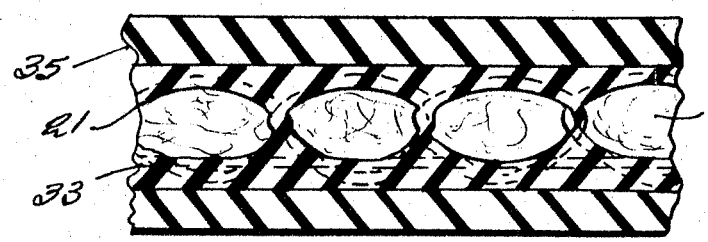
INVENTOR
JACK LEACH
BY
ATTORNEYS

United States Patent Office 3,460,599
Patented Aug. 12, 1969

3,460,599
TUBELESS TIRE HAVING IMPROVED CHAFER FABRIC
Jack Leach, Greensboro, N.C., assignor to Burlington Industries, Inc., Greensboro, N.C., a corporation of Delaware
Filed Sept. 6, 1967, Ser. No. 665,907
Int. Cl. B60c 5/12
U.S. Cl. 152—362                                                  10 Claims

ABSTRACT OF THE DISCLOSURE

A pneumatic tire, particularly a tubeless tire, is provided with a chafer in the bead portion. The chafer comprises a rubber or elastomer filled mat or web of staple fibers in more or less random array and a plurality of warp knit loop chains along it. The chains comprise interconnected loops of sewing thread along one side of the web and threads connecting between loops which pass through the web and along the other side.

---

This invention relates to an improved construction for a pneumatic tire and, more particularly, to improvements in the bead portion of a pneumatic tire of the tubeless variety for preventing inflationary air from escaping.

The development of pneumatic tubeless tires has led to tires designed to hold air without an innertube with its attendant disadvantages of hot running of the tire during road service and maintenance of the tube. To prevent the escape of air from such a tubeless tire, the carcass of the tire is made air impervious and special precautions are taken in the make up of the bead to prevent the escape of air from inside the tire casing through the bead area during road operation. Attention has been particularly directed to various types of air impervious chafer strips which extend around the bead of the tire for the purposes of reinforcing the bead and absorbing abrasion forces between the tire and that portion of the rim engaged by the bead of the tire. For example, heretofore, chafer strips have been used made of solid rubber, monofilament fabric, and impregnated cord fabric all of which are air impervious. While these and other expedients have proven successful in preventing air from passing between the tire bead and the rim, each of these air impervious chafers has disadvantages either in terms of manufacture of the chafer, incorporation into the tire, and/or operation of the tire. An all rubber chafer, for example, tends to flow from the bead area during molding of the tire requiring special precautions in the manufacture of the chafer. On the other hand, monofilament fabric chafers are not satisfactory because the monofilament crystallizes and ultimately fractures during operation of the tire. Cord chafers are not only extremely expensive, since the cords must be made air impervious, but also create problems during the building of the tire due to lack of strength of the chafer in a direction normal to the length of the cords. Bias cutting of woven chafer fabrics has been tried to improve flexibility and uniformity, but is expensive and therefore undesirable.

An improved tire chafer is disclosed in U.S. Patent No. 3,013,599 which comprises a nonwoven fabric whose interstices are filled with rubber. This tire chafer has good dimensional stability and flexibility as well as the necessary gas barrier properties, avoiding the above difficulties. However, it is subject to interlaminar separation. Nonwoven chafers of this type will separate between face and back so that the chafer, in effect, peels apart into two pieces along its linear axis under shear.

In accordance with the present invention, the tire chafer comprises a nonwoven fiber web or mat composed of staple fibers which has been integrated by chain stitching formed in a warp knitting machine, and then impregnated with rubber-like leakproof elastomers to fill the interstices of the web. The chain stitching increases the effective shear strength of the fabric without impairing its flexibility and other desirable characteristics.

The term "nonwoven fiber web" as used herein means a web of independent staple fibers in more or less random array. Loose fibers, usually 1.5 to 6.0 denier and 0.75 to 4.5 inch long are assembled in the form of a sheet or web, with the fibers extending in various directions along and across the web as well as in the direction from one surface of the web to the other. The fibers cross each other at various points throughout the web, and, as a result of fiber-fiber friction and intermeshing, the web is sufficiently stable to be wound on rolls and unwound for use.

Substantially any fibers can be used for the non-woven fiber web. These include natural fibers such as cotton, wool, sisal, jute, flax and silk and synthetic fibers such as regenerated cellulose (rayon), cellulose esters, e.g. cellulose acetate, cellulose acetate/butyrate and cellulose triacetate, acrylics, e.g. polyacrylonitrile, modacrylics, acrylonitrile-vinyl chloride copolymers, polyamides, e.g. polyhexamethylene adipamide (Nylon 66), polycaproamide (Nylon 6) and polyundecanoamide (Nylon 11), polyolefin, e.g. polyethylene and polypropylene, polyester, e.g. polyethylene terephthalate, rubber and synthetic rubber, saran, glass, etc. If necessary, the fibers can be preheated to improve adhesion to the elastomeric impregnating material. Nylon and polyesters possess certain advantages in that they absorb relatively little moisture and therefore do not release large quantities of moisture when the tire is heated. Cotton and rayon, for example, have high moisture regain, and therefore may release moisture more rapidly than it can be diffused, especially during high temperature-short time curing cycles. This can cause delamination and other defects.

There are two principal methods of making the web. In one, fibers are suspended in air and conveyed against a moving screen. Suction may be applied through the screen. This procedure results in a more or less three dimensional web, with fibers randomly arranged within the plane of the web and across it. A second important method involves forming a web in a cotton card, which lays the fibers relatively parallel and generally along the web. This type of web is somewhat different in that its dimensional stability is generally higher in the machine direction than across the web. Of course, other methods can be used in making the webs used in the present invention. Either type of web can have its thickness increased by laying against a similar web; frequently this is accomplished by laying the web back and forth across a moving conveyor, forming a layer with each traverse which overlaps the layer formed in the previous traverse. In addition, the webs can be stabilized by needle punching, a process which involves repeatedly perforating the web with a set of barbed needles. The webs also can be calendered to make them more compact.

Ordinarily, webs of this type are used by converting them into nonwoven fabrics by bonding the fibers together at points where they cross. Bonding can be accomplished, for example, with a polymeric material or by temporarily melting or dissolving small amounts of material on each fiber and then resolidifying or reprecipitating the material to form a bridge between crossing fibers. In fabrics made that way, the bridge is composed of the same material as the fibers. When a polymeric binder is used, it is possible to supply additional quantities to partly or completely fill the interstices of the web. In the present invention, the web may be lightly bonded before the sewing step. However, this usually is not necessary.

In the practice of the present invention, it is preferred to use an unbonded fiber web having a thickness of about 0.10 to 4.0 inch and a weight of 1.5 to 8.0 ounces per square yard. This web is stitched in a warp knitting machine, and is then impregnated with rubber or like elastomeric material which renders the chafer leakproof and also adapts it for bonding to the rubber in the tire.

The warp knitting operation may be accomplished on the type of apparatus described in Mauersberger U.S. Patent No. 3,030,786. Conveyor means transfer the web to a kind of sewing head, where a set of needles form a plurality of lines of chain stitches along and through the nonwoven fiber web. Each needle forms a loop by hooking a sewing thread while the needle penetrates the web, drawing the thread through the web and thereby forming a loop, penetrating the web after it has moved a distance, hooking the sewing thread again while the loop slides onto the needle shank, and casting off the loop as the needle again is retracted from the web. Thus each needle forms a chain of stitches along the fabric.

In some cases, the sewing thread is supplied alternately to adjacent needles and therefore is sewed alternately into adjacent stitches, i.e. in a tricot stitch. This causes a kind of interocking effect between adjacent lines of stitches which tends to reduce the likelihood of ripping a chain of stitches if one loop is damaged. The interlocking stitch has the further advantage of permitting use of loose warp threads which are simply laid on one side of the fiber web, but are not woven. The warp threads are held against the fiber web by the sewing thread as it zig-zags back and forth between adjacent rows of stitches. Other warp knitting stitches also may be used including a simple chain stitch in which a single thread is supplied to each needle so that the thread connecting between loops forms a substantially straight line on one side of the fabric parallel to the line or chain of loops on the other side.

Any of the above-mentioned fibers may be used in the sewing thread. Preferably, the sewing thread is 40 to 250 denier, and the stitches are about 0.9 to 5.0 mm. apart in chains about 5 to 1.4 mm. apart. This corresponds to about 5 to 18 gauge, where gauge is the number of needles per inch. In some cases, shrinkage of the fabric will reduce the gauge compared to the machine gauge so that the fabric gauge will differ from the machine gauge. Coarser or finer gauge may be used in some cases.

In accordance with the present invention, the fabric produced in this way is impregnated with a liquid containing dissolved or dispersed elastomeric material. The impregnating liquid is composed of a liquid carrier or vehicle in which is dissolved, suspended or dispersed an elastomeric or rubbery material. The liquid phase of the impregnating liquid is driven off or evaporated in a drying oven, so that the function of the liquid is to carry and deposit the solid rubbery material into the interstices of the web. The liquid preferably is of low viscosity, and is preferably aqueous, when latex particles are used, and in the event that a rubber solution is used, the liquid phase may comprise any suitable rubber solvent. The type of material within the liquid phase of the impregnating liquid is not critical for the purposes of this invention so long as it renders the web leakproof, does not unduly limit flexibility, does not degrade the fibers and adheres to unvulcanized rubber. The impregnating liquid may comprise a latex, a solution of a compounded rubber in any suitable commercial solvent, or a latex together with a material to increase adhesion of rubber to textile fibers. Examples of the rubber lattices which may be employed are natural rubber lattices and the synthetic rubber lattices, for example, lattices resulting from the polymerization of butadiene with styrene, and butadiene with vinyl pyridine. Examples of the materials which may be added to improve the adhesion to textiles are various aldehydes, such as formaldehyde, acetaldehyde, butyraldehyde, furfuryl butyraldehyde an complementary resin-forming reactants, such as phenols or phenolic compounds, such as resorcinol, naphthol, cresol, phenolic compounds, such as aniline, cyanamid and urea.

After drying and curing, the elastomeric material will constitute about 5 to 50% by weight of the total of elastomeric material and sewn web, and the weight of the material will be about 3 to 16 ounces per square yard.

The impregnated fabric may have calendered on a layer of tire or green rubber which renders it tacky so that it will stick to other components when the tires are being assembled. However, this can be omitted if the impregnant contains a green tack adhesive addition to be described further herein, which renders the impregnated chafer fabric adequately tacky and eliminates the need for the calendered on layer.

The invention described above will be better understood from the following description of a preferred embodiment, reference being made to the drawing, in which:

FIGURE 1 is an enlarged sectional view of the bead portion of a tubeless tire, made according to this invention, mounted on a rim;

FIGURE 2 is an enlarged plan view of the fabric used as a tire chafer strip in accordance with the present invention, partly shown unimpregnated; and FIGURE 3 is a cross-section along lines 3—3 of FIGURE 2.

Referring to the drawings, the invention is shown as applied to a tubeless tire having a bead portion 1 shown in FIGURE 1 in which is disposed the usual bead ring 2 encased in rubber and around which the reinforcing plies 3, 4, 5 and 6 are wrapped to anchor the reinforcing plies to provide a unitary structure. The reinforcing plies may be made of any suitable synthetic or natural fiber and consist of cords which extend from bead portion to bead portion with the endings of the outer plies 3 and 4 overlapping the inner plies 5 and 6. The bead rings 2 are provided with an inner reinforcing wrapper, or flipper 7, which encloses the bead ring and has its marginal portions extending radially outwardly of the bead ring 2. According to the usual practice, the reinforcing plies 3, 4, 5 and 6 have their opposite faces friction coated with a thin layer of rubber composition prior to incorporation into the tire. The chafer strips 8 are wrapped around the bead portions of the tire outwardly of the reinforcing plies to prevent the abrasion created between the bead base 9 and the rim 10 from chafing or fraying the reinforcing plies. The chafer 8 extends from the toe 11 of the bead portion of the tire to a location radially outwardly of the rim flange engaging portion or heel 12 of the tire.

The fabric illustrated in FIGURES 2 and 3, used in the tire chafer of this invention, comprises a nonwoven fiber web 20 held together by sewing thread 21 formed into interlocked chain stitching. The fabric is shown with a layer 35 of unvulcanized rubber calendered to each side, although, as will be explained further, this may be omitted. Each sewing thread 21 is formed into a plurality of loops 22 spaced along the length of the fabric. Sewing thread connecting the loops with others passes through the web and through the next preceding loops in the chain.

In a preferred embodiment, illustrated in the drawing, a tricot stitch is used. The loops are formed into parallel chains, but each chain is formed from two threads which alternately are formed into loops of adjacent chains. For example, one chain of loops, designated 23 in the drawing, is formed from two threads 24 and 25. A first loop 26 is formed from thread 24, the next loop 27 is formed from thread 25 and the next loop 28 is formed from thread 24, etc. Thread 24 also is formed into loops 29 in chain 30 on one side of chain 23, alongside loop 27 and other loops in chain 23 which are formed from thread 25. Similarly, thread 25 is formed into loops 31 in a chain 32 on the other side of chain 23, alongside loops 26 and 28 in chain 23. Thus, parallel chains of loops extend along one side of the fabric. Sewing thread connecting between loops, after passing through other loops and through the web, zig-zags back and forth between adjacent chains. The arrangement is such that each sewing thread is interlocked with two others in adjacent loop chains, so that, if a thread breaks, it will not pull out a succession of stitches as it would if each chain were formed from a single thread.

FIGURE 2 also illustrates warp yarns 33 laid against the web and held in place by the sewing threads as they extend back and forth between loop chains. Thus the interlocking chain stitch provides the further advantage of making possible the use of warp yarn, which improves dimensional stability of the fabric in the machine direction. Of course, if a simple chain stitch is used, without interlocking, the warp yarn is omitted.

The sewn nonwoven fiber web thus produced, 34, is prepared for use by first impregnating it, e.g. by conveying it into a dipping tank by means of a conveyor, preferably made of wire mesh, so that as the impregnated sheet emerges from the impregnating liquid, the excess liquid, removed by squeeze rolls, can drain into the tank. The sheet is slowly passed through the tank to insure that the liquid has thoroughly filled the interstices in between the filaments. The sheet is then passed through a drying oven wherein it is slowly dried at relatively low temperature, preferably less than 300° F., to avoid rapid removal of the vehicle or carrier for the rubbery material. After passage through the dying oven the sheet may be rolled upon itself to form a roll. If desired, the sheet may be subsequently rubberized by calendering in the conventional manner with a layer of unvulcanized rubber 35 on both sides of the impregnated sheet. After calendering, if necessary, the sheets are cut to suitable dimensions in accordance with usual tire manufacturing procedure to form the chafer strips. The chafer strip 8 is incorporated into the bead portion in the usual manner by placing the chafer 8 in face to face contact with the outermost reinforcing ply so that the chafer 8 is in position to receive any chafing or wearing between the heel portion 12 and the rim 10. In employing chafer strips made according to this invention, no special care or precautions need be taken in the building operations since the chafer 8 has substantial strength longitudinally and transversely thereof and is readily adhered to the bead portion 8 via the calender rubber coat 35.

In a typical embodiment there is used an air-laid batting of rayon fibers about 3 denier and 2 inches long, the web having a weight of 3 ounces per square yard. The web was sewn with 140 denier polyester sewing thread with stitches 1 mm. apart in chains 1.8 mm. apart. Samples were dipped in various lattices having compositions as follows, all parts being by weight.

| | | | | |
|---|---|---|---|---|
| Copolymer of styrene-butadiene rubber and vinyl pyridene | 365.0 | 365.0 | 207.6 | 207.6 |
| Styrene butadiene rubber (Pliolite 176) | | | 181.1 | 181.1 |
| Resin master, a water-soluble resorcinol formaldehyde condensate, 6.25% solids | 275.0 | 275.0 | 318.6 | 318.6 |
| Nonionic surfactant | 0.83 | 0.83 | 0.83 | 0.83 |
| Water | 186.7 | 373.4 | 125.17 | 250.34 |
| Flake caustic (sodium hydroxide) | | | 1.0 | 1.0 |
| 28% ammonia | 6.0 | 6.0 | | |

The caustic and ammonia may be combined, or used separately as indicated above.

Some samples were dipped once and others were dipped twice. After removing excess liquid, the samples were dried for 3 minutes in an oven maintained at 260° F. Fabrics dipped twice were dried and cured after each dip. The results are given in the following table:

TABLE

| Sample No. | Latex formulation | Solids content of latex, weight percent | Number of dips in latex | Dry weight of fabric and dip | Weight of Griege fabric before dipping | Adhesion BFG | Adhesion GRY | Diffusion | Grab tensile, W/F | Elongation at break, percent | Elongation at 0# tensile (Scott Tester), 20# limit |
|---|---|---|---|---|---|---|---|---|---|---|---|
| 1 | A | 10 | 1 | 5.70 | 5.40 | 17/22 | 13 | L x L | 44/90 | | |
| 2 | A | 10 | 2 | 6.00 | 5.40 | 20 | 16 | L x L | 87/87 | | |
| 3 | B | 20 | 1 | 5.90 | 5.40 | 22/35 | 17 | 0 x 0 | 100/109 | 66/117 | 33/41 |
| 4 | B | 20 | 2 | 6.90 | 5.40 | 30/40 | 17 | 0 x 0 | 90/94 | | |
| 5 | C | 11.5 | 1 | 5.80 | 5.40 | 20 | 15 | L x L | 82/100 | 83/133 | 35/50 |
| 6 | C | 11.5 | 2 | 6.90 | 5.40 | 23 | 17 | L x L | 82/102 | 66/159 | 10/55 |
| 6 | D | 23 | 1 | 6.10 | 5.40 | 25/30 | 20 | 0 x 0 | 90/84 | 79/166 | 25/70 |
| 8 | D | 23 | 2 | 7.00 | 5.40 | 23/45 | 17 | 0 x 2L | 82/89 | 75/141 | 25/58 |
| Griege | | | | | 5.40 | | | | 40/85 | 100/158 | 83/95 |

In the above example, the rubber was cured after drying to test its properties. However, it is generally desirable not to vulcanize rubber until the chafer is incorporated into a tire, after calendering on layers of unvulcanized rubber, if necessary.

If the calendered rubber is to be omitted, as explained above, it is necessary to provide "green tack" in the impregnant itself so that the chafer fabric can be held to the other components as the tire is assembled. A suitable impregnant would be a latex containing 15.5% solids natural rubber, 15.75% solids of a copolymer of styrene-butadiene rubber and vinyl pyridine, about 20% solids of pine tar rosin (sometimes called a hydrocarbon resin) and about 2.25% water-soluble resorcinol-formaldehyde precondensate. The natural rubber provides stickiness while the rosin provides tack. Of course other tacky, curable rubber formulations can be used.

These fabrics possess the advantages of non-woven tire chafers without the attendant difficulty of delamination under shear.

It will be appreciated that these exmaples have been provided for purposes of illustration only, and are not intended as limiting. Various changes may be made in details of construction of the chafers, the materials used in them, and the tires in which they are incorporated without departing from the scope of the invention, as defined in the appended claims.

What is claimed is:

1. An inflatable tubeless tire comprising a hollow annular body of resilient rubbery material reinforced with cord fabric and having beads at the inner periphery which are adapted to seat on a rim so that the tire and rim form an air chamber, each of said beads having a chafer terminating at one edge at a location adjacent to the toe portion of the bead and at the other edge at a location adjacent to the sidewall of the tire to form a support for the surfaces of the beads resting on the rim, said chafer comprising a thin mat made of staple fibers extending in random disposition in said mat, the fibers of said mat laying upon each other forming a multiplicity of interstices, whereby in the untreated condition said mat is normally pervious to air parallel to its surfaces, and a plurality of warp knitted loop chains of sewing thread along said mat with loops along one side of said mat and sewing thread connecting between loops passing through the loops in said chains and said mat and along the opposite side of the mat, said interstices being filled with an impregnant of rubbery material in sufficient quantity to bar the passage of air in a direction parallel to the surface of said mat.

2. An inflatable tubeless tire comprising a hollow annular body of resilient rubbery material reinforced with cord fabric and having beads at the inner periphery which are adapted to seat on a rim so that the tire and rim form an air chamber, each of said beads having a chafer terminating at one edge at a location adjacent to the toe portion of the bead and at the other edge at a location adjacent to the sidewall of the tire to form a support for the surfaces of the beads resting on the rim, said chafer being made of compact layers of fibers extending in random disposition forming a thin mat, and a plurality of warp knitted loop chains of sewing thread along said mat with loops along one side of said mat and sewing thread connecting between loops passing through the loops in said chains and said mat and along the opposite side of the mat, said mat being impregnated with a rubbery material in sufficient quantity to bar the passage of air along the length of said web.

3. An inflatable tubeless tire comprised of a hollow annular body of resilient rubbery material reinforced with cord fabric and having beads at the inner periphery thereof which are adapted to seat on a rim so that the tire and rim form an air chamber, each of said beads having a chafer terminating at one edge at a location adjacent to the toe portion of the bead and at the other edge at a location adjacent to the sidewall of the tire to form a support for the surfaces of the beads resting on the rim, said chafer comprising a mat of compacted staple textile fibers which extend in random disposition within said mat and laying in contact with each other to form minute interstices, and a plurality of wrap knitted loop chains of sewing thread along said mat with loops along one side of said mat and sewing thread connecting between loops passing through the loops in said chains and said mat and along the opposite side of the mat, said interstices being filled with an impregnant of rubbery material in sufficient quantity to reduce the air diffusion rate parallel to the surface of said mat to substantially zero.

4. An inflatable tubeless tire comprised of a hollow annular body of resilient rubbery material reinforced with cord fabric and having beads at the inner periphery thereof which are adapted to seat on a rim so that the tire and rim form an air chamber, each of said beads having a chafer terminating at one edge at a location adjacent to the toe portion of the bead and at the other edge at a location adjacent to the sidewall of the tire to form a support for the surfaces of the beads resting on the rim, said chafer comprising short lengths of textile filaments laid upon each other in random disposition to form a dense mat-like web, said filaments forming minute interstices within said web and a plurality of warp knitted loop chains of sewing thread along one side of said web and sewing thread connecting between loops passing through the loops in said chains and said web and along the opposite side of the web, said interstices being filled with an impregnant of rubbery material which bonds readily to textiles and rubber in an amount sufficient to reduce the air diffusion rate parallel to the surfaces of said web to substantially zero.

5. A tubeless tire as claimed in claim 4 in which said chafer is skin coated with unvulcanized rubber prior to incorporation into the bead of the tire.

6. An inflatable tubeless tire as set forth in claim 4 in which each of said loop chains comprises alternate loops formed of two different sewing threads and sewing threads form loops in two adjacent loop chains, said sewing threads connecting between said loops zig zagging back and forth between adjacent loop chains.

7. An inflatable tubeless tire as set forth in claim 4 in which at least part of said loop chains are simple chain stitching having only one thread in each chain and with chains of loops on one side of the web and sewing thread connecting between loops in substantially straight lines on the other side of the web.

8. An inflatable tubeless tire as set forth in claim 4 in which there are about 5 to 18 of said chains per inch of web width.

9. An inflatable tubeless tire as set forth in claim 8 in which said sewing thread passes through said web at stitch points along said chains about 0.9 to 5.0 mm. apart.

10. An inflatable tubeless tire as set forth in claim 4 in which said rubbery material is a tacky curable rubber composition capable of sticking said chafer strip to other components of said tire prior to curing, whereby a skin coating of tacky rubber on said chafer strip is unnecessary.

References Cited

UNITED STATES PATENTS 2,947,340   8/1960   French.
3,013,599   12/1961   Riggs.

ARTHUR L. LA POINT, Primary Examiner

CHARLES B. LYON, Assistant Examiner

U.S. Cl. X.R.

152—358